(12) United States Patent
Van Dyke et al.

(10) Patent No.: US 6,469,246 B1
(45) Date of Patent: Oct. 22, 2002

(54) DAMPER FOR AN OVERHEAD CABLE

(75) Inventors: Pierre Van Dyke, Montréal (CA); Roger Paquette, St-Antoine sur Richelieu (CA)

(73) Assignee: Hydro-Quebec, Montreal (CA)

( * ) Notice: Subject to any disclaimer, the term of this patent is extended or adjusted under 35 U.S.C. 154(b) by 30 days.

(21) Appl. No.: 09/590,370

(22) Filed: Jun. 9, 2000

(30) Foreign Application Priority Data

Jun. 11, 1999 (CA) .............................. 2274402

(51) Int. Cl.$^7$ ................................ H02G 7/14
(52) U.S. Cl. .................... 174/42; 174/40 R; 174/138 G
(58) Field of Search ........................ 174/42, 69, 73.1, 174/135, 139, 138 G, 140 R, 181

(56) References Cited

U.S. PATENT DOCUMENTS

| | | | |
|---|---|---|---|
| 2,094,899 A | 5/1937 | MacIntyre | 173/13 |
| 2,688,047 A | 8/1954 | MacIntyre | 174/42 |
| 3,314,503 A | 4/1967 | Neubert | 188/1 |
| 3,662,084 A | 5/1972 | Smrekar | 174/42 |
| 3,692,919 A | 9/1972 | Rostoker | 174/42 |
| 3,711,624 A | 1/1973 | Dulhunty | 174/42 |
| 3,773,967 A | 11/1973 | Sturm | 174/42 |
| 3,780,207 A | 12/1973 | Crosby et al. | 174/42 |
| 3,870,815 A | * 3/1975 | Hawkins | 174/42 |
| 3,904,811 A | 9/1975 | Otsuki et al. | 174/42 |
| 4,011,397 A | 3/1977 | Bouche | 174/42 |
| 4,113,979 A | 9/1978 | Torr et al. | 174/42 |
| 4,140,868 A | 2/1979 | Tuttle | 174/42 |
| 4,159,393 A | 6/1979 | Dulhunty | 174/42 |
| 4,167,646 A | 9/1979 | Mathieu | 174/42 |
| 4,188,502 A | * 2/1980 | Gagne | 174/42 |
| 4,223,176 A | 9/1980 | Hawkins | 174/42 |
| 4,259,541 A | 3/1981 | Bouche | 174/42 |
| 4,278,833 A | 7/1981 | Hawkins | 174/42 |
| 4,385,201 A | 5/1983 | Nigol et al. | 174/42 |
| D278,175 S | 3/1985 | Hardtke | D99/25 |
| 4,523,053 A | 6/1985 | Rawlins | 174/42 |
| 4,525,596 A | 6/1985 | Diana | 174/42 |
| 4,527,009 A | 7/1985 | Hawkins | 174/42 |
| 4,533,785 A | 8/1985 | Riganti | 174/42 |
| 4,554,402 A | 11/1985 | Hawkins et al. | 174/42 |
| 4,554,403 A | 11/1985 | Hearnshaw | 174/42 |
| 4,620,059 A | 10/1986 | Sherman | 174/42 |
| 4,620,060 A | 10/1986 | Perinetti | 174/42 |
| 4,680,424 A | 7/1987 | Hawkins | 174/42 |
| 4,714,799 A | 12/1987 | Hawkins | 174/42 |
| 4,777,327 A | 10/1988 | Richardson, Jr. | 174/42 |
| 4,808,766 A | 2/1989 | Buckner et al. | 174/42 |
| 5,801,329 A | 9/1998 | Schmidt | 174/42 |

FOREIGN PATENT DOCUMENTS

GB 503445 4/1939

\* cited by examiner

*Primary Examiner*—Dean A. Reichard
*Assistant Examiner*—Jinhee Lee
(74) *Attorney, Agent, or Firm*—Foley & Lardner

(57) ABSTRACT

A damper for absorbing vibrations in an overhead cable which has a support member attached to the cable and at least one dampening member pivotally connected to an axial member mounted on a support axis extending substantially horizontally under the cable. Each dampening member has an arm provided with a weight and having an end effecting the connection to the axial member. Both the axial member and the end of the dampening member have cooperating pairs of stops limiting the pivotal movement of the dampening member around the support axis. Between the corresponding stops of the axial member and end of the dampening member are provided resilient cylinders further limiting the pivoting of the dampening member in a resilient manner.

12 Claims, 5 Drawing Sheets

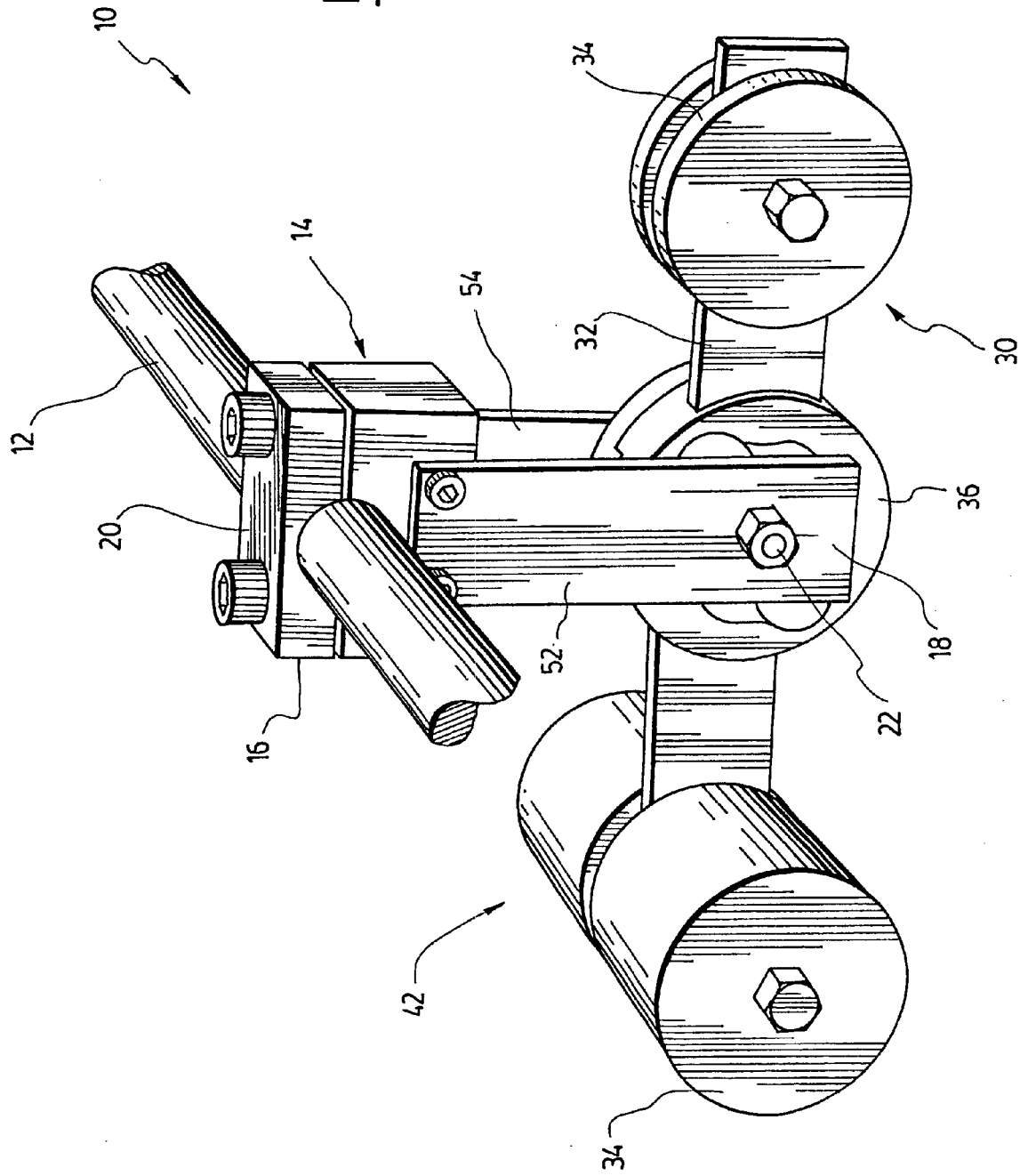

DAMPER FOR AN OVERHEAD CABLE

This application claims the benefit of and priority to Canadian Application 2274402 filed on Jun. 11, 1999.

FIELD OF THE INVENTION

The present invention relates to a damper for an overhead cable such as cables of electrical transmission lines.

BACKGROUND

Wind blowing across a suspended conductor of a transmission line is a very well known source of damage. It induces vibrations which, under resonant conditions, build up to large amplitudes resulting in destructive forces on the conductor. To alleviate this problem, there is known to install a damping device on the conductor, which absorbs the vibration energy. For example, torsional dampers are devices comprising two ball-shaped weights rigidly connected together and fixed on the side of the conductor. When a vertical vibration is induced in the conductor, it is transferred to the weight which rotates in a plan perpendicular to the conductor, inducing therein a torsional movement which is attenuated much more quickly than the vibrational movement. In dampers of the type known as Stockbridge, two weights are suspended on each side of a length of cable called "messenger". When the conductor vibrates, it excites the weights generating a flexion in the messenger. The strands in the messenger rub against each other, dissipating the energy. The above described dampers are efficient in reducing wind vibrations, but lack endurance and need to be replaced often, especially in harsh climates.

Also known in the art is U.S. Pat. No. 4,167,646 (MATHIEU). Mathieu discloses a vibration damper for overhead conductors, having two weight each connected to a rigid arm, each arm being themselves connected through an elastomer ball to a clamp attached to the conductor. The use of an elastomer joint allows a more solid connection compared to the traditional messenger. However, ball-shaped elastomer joints are relatively difficult and therefore expensive to manufacture and install.

Other related art includes U.S. Pat. No. 2,094,899 (D. MacINTYRE); U.S. Pat. No. 2,688,047 (D. MacINTYRE); U.S. Pat. No. 3,314,503 (V.H. NEUBERT); U.S. Pat. No. 3,662,08 (SMREKAR); U.S. Pat. No. 3,692,919 (ROSTOKER); U.S. Pat. No. 3,711,624 (DULHUNTY); U.S. Pat. No. 3,773,967 (STURM): U.S. Pat. No. 3,780,207 (CROSBY et al.); U.S. Pat. No. 3,904,811 (OTSUKI et al.); U.S. Pat. No. 4,011,397 (BOUCHE); U.S. Pat. No. 4,113, 979 (TORR et al.); U.S. Pat. No. 4,140,868 (TUTTLE); U.S. Pat. No. 4,159,393 (DULHUNTY); U.S. Pat. No. 4,167,646 (MATHIEU); U.S. Pat. No. 4,223,176 (HAWKINS); U.S. Pat. No. 4,259,541 (BOUCHE); U.S. Pat. No. 4,278,833 (HAWKINS); U.S. Pat. No. 4,523,053 (RAWLINS); U.S. Pat. No. 4,525,596 (DIANA); U.S. Pat. No. 4,527,009 (HAWKINS); U.S. Pat. No. 4,533,785 (RIGANTI); U.S. Pat. No. 4,554,402 (HAWKINS); U.S. Pat. No. 4,554,403 (HEARNSHAW); U.S. Pat. No. 4,620,059 (SHERMAN); U.S. Pat. No. 4,620,060 (PERINETTI); U.S. Pat. No. 4,680, 424 (HAWKINS); U.S. Pat. No. 4,714,799 (HAWKINS); U.S. Pat. No. 4,777,327 (RICHARDSON, Jr.); U.S. Pat. No. 4,808,766 (BUCKNER et al.); and U.S. Pat. No. 5,801,329 (SCHMIDT). None of these patents disclose a resistant damper for overhead conductors which is relatively easy and inexpensive to manufacture.

OBJECT AND SUMMARY OF THE INVENTION

It is therefore an object of the present invention to provide a damper for an overhead cable that is resistant, even in harsh climates.

It is another object of the invention to provide such a damper that is relatively easy and inexpensive to manufacture.

Accordingly, the present invention provide a damper for an overhead cable, comprising:

a support member having a first end provided with a connecting means for connecting said support member to the overhead cable, and a second end having a support axis extending substantially horizontally when the damper hangs from the overhead cable, the support member further including an axial member mounted along the support axis and rigidly connected to the second end, the axial member being provided with at least one pair of stops;

a first dampening member having an arm and a weight connected thereto, the arm having an end pivotally connectable to the support axis, the end of the arm being provided with at least one pair of stops corresponding to and cooperating with the at least one pair of stops of the axial member for limiting a pivotal movement of the first dampening member in both directions;

resilient means located between the pairs of stops of the axial member and the corresponding pairs of stops of the arm for limiting in a resilient manner the pivotal movement of the first dampening member around the support axis; and restraining means for restraining a movement of the end of the arm of the first dampening member along the support axis.

Other features and advantages of the present invention will be better understood upon reading the following non-restrictive description of embodiments thereof with reference to the appended drawings.

BRIEF DESCRIPTION OF THE DRAWINGS

FIGS. 1A and 1B are perspective views of dampers installed on an overhead cable in accordance with two embodiments of the invention.

DESCRIPTION OF PREFERRED EMBODIMENTS OF THE INVENTION

Figure 1B:
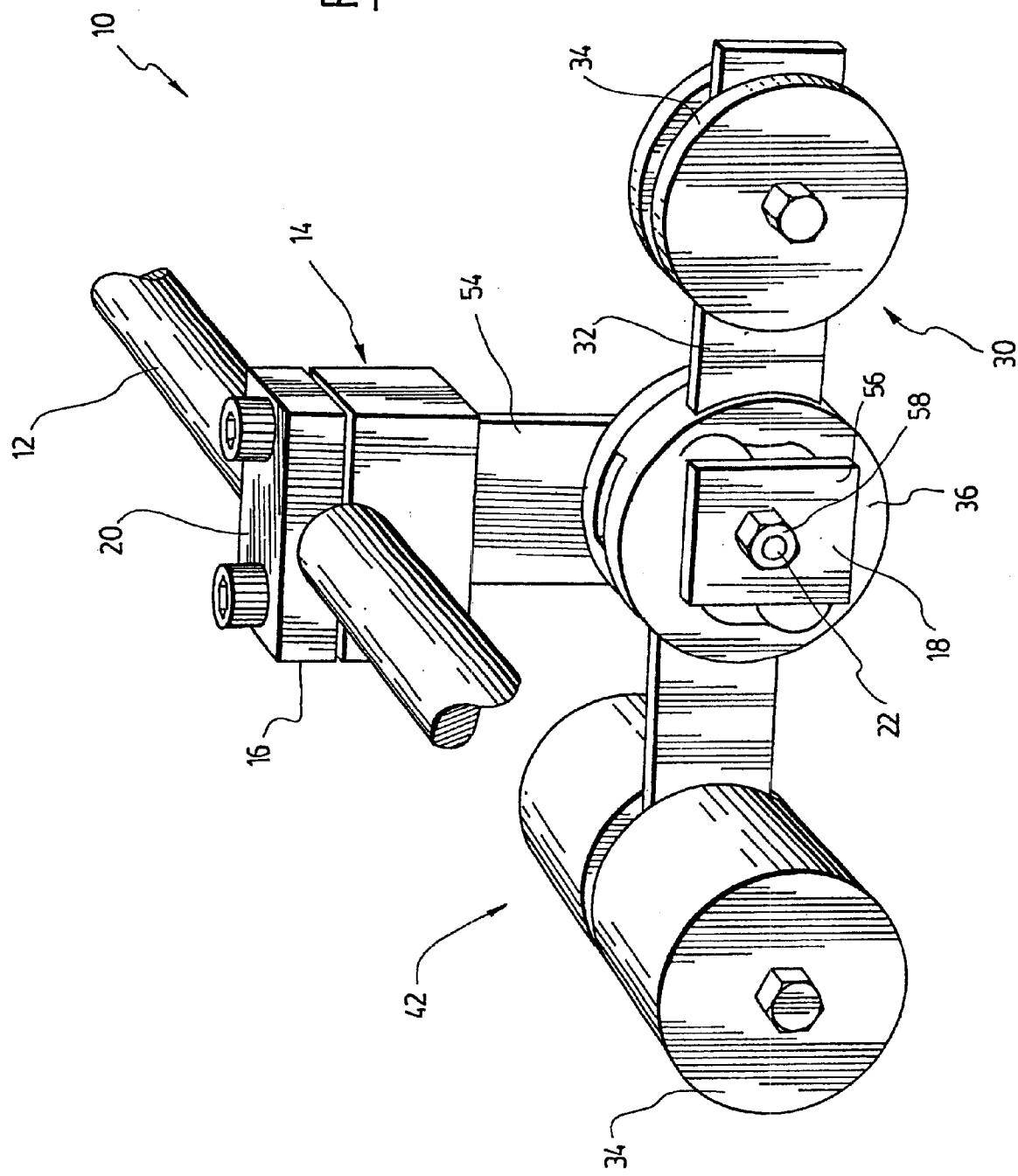

Referring to FIGS. 1A, 1B and 2 to 5, there is shown a damper 10 for an overhead cable 12 according to embodiments of the present invention.

The damper 10 first includes a support member 14, which has a first end 16 and a second end 18. The first end 16 is connected to the overhead cable 12, here by a clamp 20. Any other appropriate connecting means may of course be used without departing from the scope of the invention. A support axis 22 is provided at the second end 18 and held thereto by a nut 58, extending substantially horizontally when the damper 10 hangs from the overhead cable 12. The support member 14 further includes an axial member 24 mounted along the support axis 22, and a connecting mechanism for rigidly connecting the axial member to the second end 18. The connecting mechanism comprises recesses 51 formed in the second end 18 of the support member 14 and projections 53 of the axial member 24 that cooperate with the recesses 51.

The axial member 24 is provided with at least one pair of stops. In the embodiment illustrated in FIG. 2, the axial member 24 is cross-shaped and has four radial legs 26a, 26b, 26c and 26d, defining four V-shaped inner corners 28a, 28b, 28c and 28d. Four first pairs of stops are therefore provided on the axial member 24 in this embodiment, defined by the branches of inner corners 28a, 28b, 28c and 28d.

Figure 2:
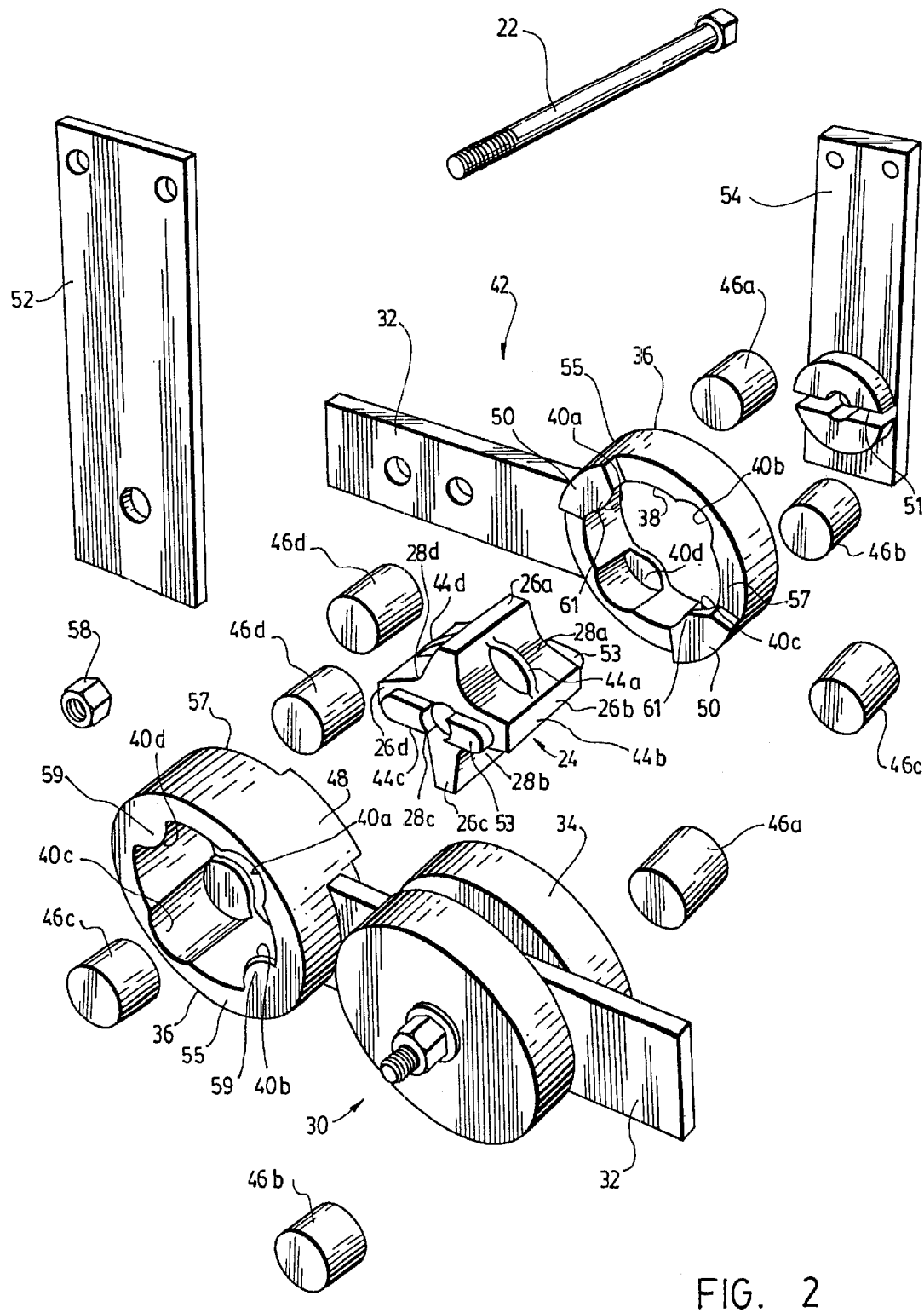
FIG. 2 is an exploded view of the damper of FIG. 1A.
Figure 4:
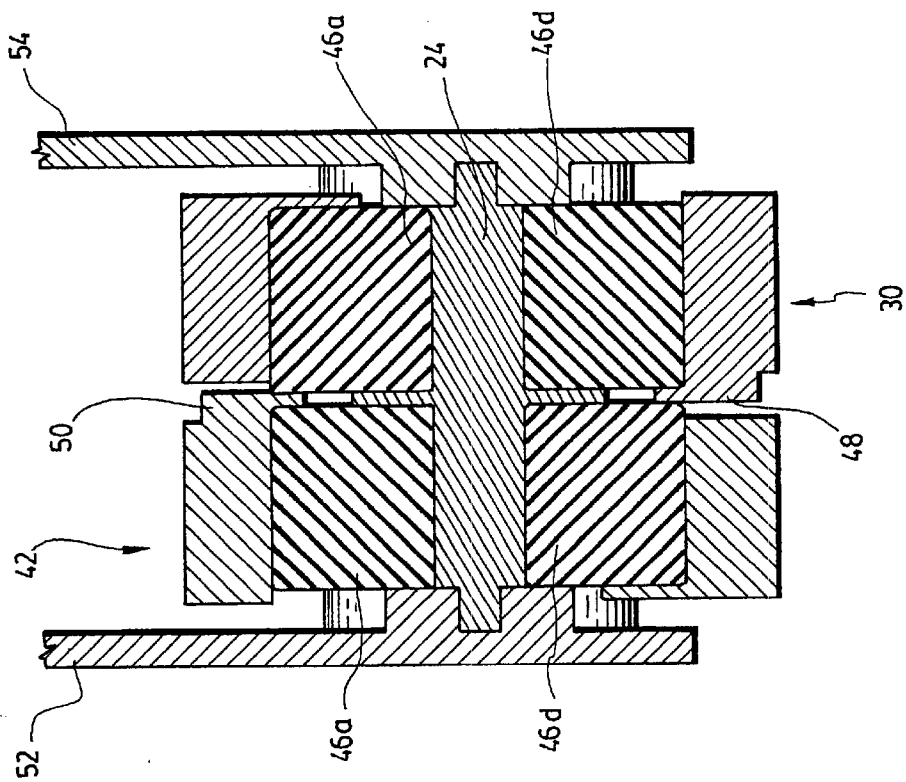
FIG. 4 is a cross-sectional view along lines IV—IV of FIG. 3.
Figure 3:
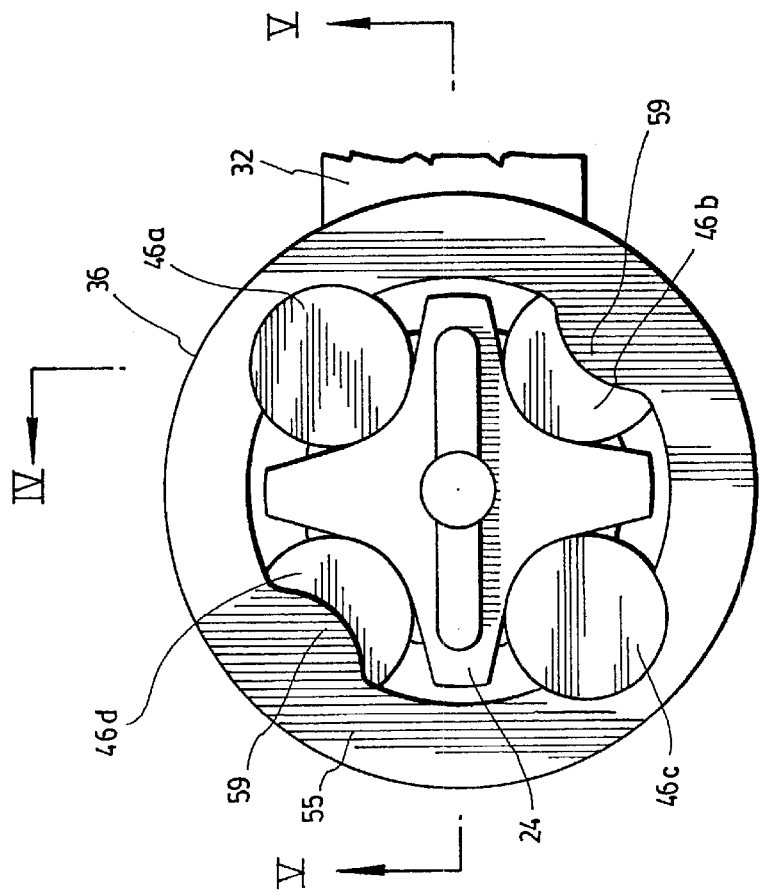
FIG. 3 is a front view of the end of the arm of the first dampening member of the damper of FIG. 1A.
Figure 5:
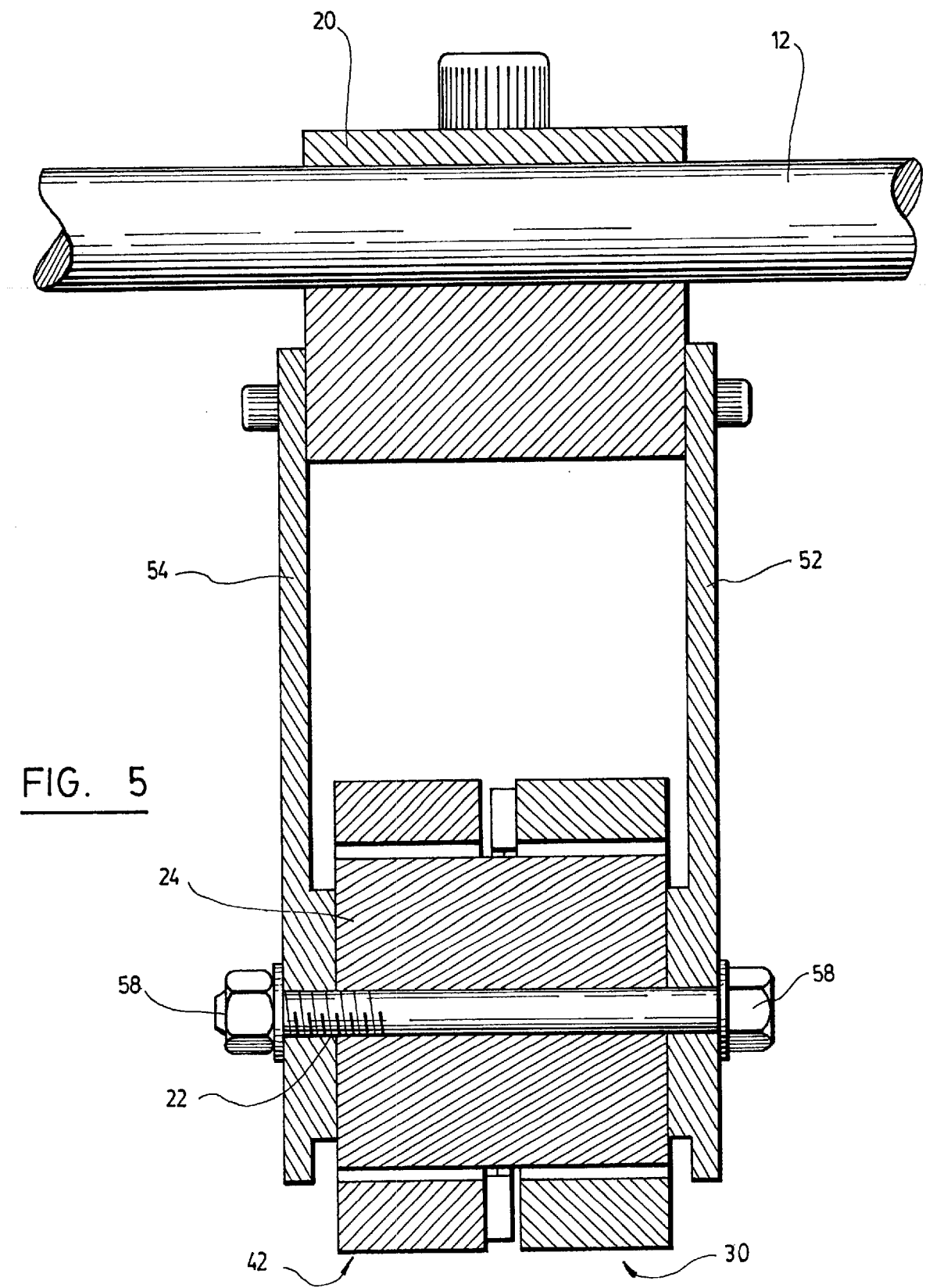
FIG. 5 is a cross-sectional view along lines V—V of FIG. 3.

In the embodiment of FIGS. 1A and 2, the axial member 24 is supported by two parallel arms 52 and 54 rigidly fixed to the clamp 20 of the support member 14 and projecting downwardly therefrom. The support axis 22 extends from one arm 52 to the other 54. The axial member 24 is pivotally connected to the support axis 22, and is held in a fixed position with respect to the arms 52 and 54 by means of recesses 51 which cooperate with projections 53 of the axial member 24. Referring now to FIG. 1B, the arm 54 may also be omitted and simply replaced by a closing plate 56, to limit manufacturing costs.

Referring again to FIGS. 1A, 1B and 2 to 5, the damper 10 also includes a first dampening member 30, having an arm 32 to which is connected a weight 34. The arm 32 has an end 36 mounted around the axial member 24, the end 36 being provided with at least one pair of stops, corresponding to and cooperating with the at least one pair of stops of the axial member 24 for limiting a pivotal movement of the first dampening member 30 in both directions with respect to the axial member 24. Preferably, the end 36 of the arm 32 comprises an inner cylindrical wall 38 having four arc-shaped cavities 40a, 40b, 40c and 40d regularly distributed along its circumference, defining four pairs of stops of the end 36 of the arm 32 which cooperate with the four first pairs of stop of the axial member 24.

The damper 10 according to the present invention may include any number of dampening members similar to the first dampening member 30 as may be convenient. Preferably, two dampening members are provided, extending on each side of the axial member 24. The second dampening member 42 includes the same components as the first dampening member 30, that is an arm 32 having a weight 34 connected thereto and having an end 36 mounted around the axial member 24. Advantageously, the weights 34 of the dampening members may be different, that is one heavier than the other, to provide different resonance frequencies for the vibration of each dampening member.

The end 36 of the arm 32 of the second dampening member 42 is also preferably provided with an inner cylindrical wall 38 having four arc-shaped cavities 40a, 40b, 40c and 40d regularly distributed along its circumference, defining four pairs of stops of the end 36 of the arm 32. In this embodiment the axial member 24 has four second pairs of stops provided by the branches of inner corners 28a, 28b, 28c and 28d to cooperate with the four pairs of stops provided by the four arc-shaped cavities. 40a, 40b, 40c and 40d of the second dampening member 42. The axial member 24 includes four radial separating shoulders 44a, 44b, 44c and 44d extending respectively in the V-shaped inner corners 28a, 28b, 28c and 28d. The V-shaped inner corners 28a, 28b, 28c and 28d in this manner embody on one side of the shoulders 44a, 44b, 44c and 44d the four first pairs of stops and on the other side of the shoulders the four second pairs of stops.

The damper 10 further includes resilient means located between the pairs of stops of the axial member 24 and the corresponding pairs of stops of each arm 32, for limiting in a resilient manner the pivotal movement of the corresponding dampening member around the support axis 22. The resilient means preferably include four cylindrical-shaped elastomer bodies 46a, 46b, 46c and 46d per dampening member, partially located in the corresponding arc-shaped cavities 40a, 40b, 40c and 40d and in the V-shaped inner corners 28a, 28b, 28c and 28d. The cylindrical-shaped elastomer bodies 46a, 46b, 46c and 46d extend along axes parallel to the support axis 22. One end of each cylinder-shaped elastomer bodies 46a, 46b, 46c and 46d abut on the shoulders 44a, 44b, 44c and 44d, and the opposed end abuts on the second end 18 of the support member. In this manner, an axial displacement of cylinder-shaped elastomer bodies 46a, 46b, 46c and 46 along the support axis 22 is prevented.

The damper 10 according to the present invention also includes restraining means for restraining a movement of the end of the arm 36 of each dampening member 30 and 42 along the support axis 22. For each dampening member, these restraining means include the corresponding cylinder-shaped elastomer bodies 46a, 46b, 46c and 46d and face walls extending along each face of the end of the arm 36. The first face walls 59 partially close the two arch-shaped cavities 40b and 40d along the first face 55 of the end of the arm 36. Similarly, the second face walls 61 close the remaining two arc-shaped cavities 40a and 40c along the second face 57 of the end of the arm 36. These walls cooperate with the cylinder-shaped elastomer bodies 46a, 46b, 46c and 46d, each of which abuts on one of the wall at one of its ends. This prevents an axial movement of the end of the arm 36 with respect to the cylinder-shaped elastomer bodies 46a, 46b, 46c and 46d. Since these elastomer bodies are themselves prevented from an axial displacement with respect to the support axis 22, the result is that the axial movement of end of the arm 36 with respect to the support axis 22 is resiliently restrained by the restraining means.

Preferably, the end 36 of the arm 32 of the first dampening member 30 comprises an outward stop 48 projecting toward the second dampening member 42. Similarly, the end 36 of the arm 32 of the second dampening member 42 comprises an outward stop 50 projecting toward the first dampening member 30. The outward stops 48 and 50 cooperate together to prevent the pivotal movement of the dampening members past a predetermined pivoting angle. In the preferred embodiment, two outward stops 48, 50 are provided on each dampening member 30, 42.

Of course, numerous modifications could be made to the preferred embodiments disclosed hereinabove without departing from the scope of the invention as defined in the appended claims.

What is claimed is:

1. A damper for an overhead cable, comprising:
a support member having a first end provided with a connecting means for connecting said support member to the overhead cable, and a second end having a support axis extending substantially horizontally when the damper hangs from the overhead cable, the support member further including an axial member mounted along the support axis, a connecting means rigidly connecting said axial member to the second end, the axial member having a plurality of radial arms extending radially from the support axis along a length of said axial member, said radial arms defining substantially V-shaped inner corners therebetween, the axial member further having a plurality of separating shoulders extending within a radial plane substantially perpendicular to said support axis, each of said separating shoulders extending within one of said V-shaped inner corners;
a first dampening member having an arm and a weight connected thereto, the arm having an end mounted around the axial member, the end of the arm having an inner cylindrical wall regularly provided with a plurality of cavities corresponding to and cooperating with the V-shaped inner corners of the axial member on a first side of the separating shoulders for limiting a pivotal movement of the first dampening member in both directions;

a second dampening member having an arm and a weight connected thereto, the arm having an end mounted around the axial member, the end of the arm having an inner cylindrical wall regularly provided with a plurality of cavities corresponding to and cooperating with the V-shaped inner corners of the axial member on a second side of the separating shoulders for limiting a pivotal movement of the second dampening member in both directions;

a plurality of resilient members each located between the V-shaped inner corners of the axial member and the corresponding cavities of the arm of each dampening member for damping in a resilient manner the pivotal movement of the first and second dampening members around the support axis; and restraining means for restraining a movement of the end of the arm of the first and second dampening members along the support axis.

2. A damper according to claim 1, wherein the axial member comprises four of said radial arms, and the end of the arm of each dampening member comprises four of said cavities.

3. A damper according to claim 2, wherein said cavities are arc-shaped, and the plurality of resilient members are defined by two sets of four cylindrical-shaped elastomer bodies partially located in the arc-shaped cavities of the first and second dampening members and in the V-shaped inner corners on a corresponding side of the separating shoulders, each of the cylindrical-shaped elastomer bodies extending along an axis parallel to the support axis and abutting at one end on a corresponding one of the separating shoulders to prevent an axial displacement of each of the cylindrical-shaped elastomer bodies.

4. A damper according to claim 3, wherein the end of the arm of each of the first and the second dampening member has a first face and a second face opposite the first face, and the restraining means comprise said cylindrical-shaped elastomer bodies, and further comprise, for each of said dampening members:

first face walls partially closing two of the arc-shaped cavities along the first face of the end of the arm; and second face walls partially closing remaining two arc-shaped cavities along the second face of the end of the arm, the cylindrical bodies cooperating with the first face and second face walls for restraining in a resilient manner the movement of the end of the arm of the corresponding dampening member along the support axis.

5. A damper according to claim 1, wherein the end of the arm of the first dampening member comprises an outward stop projecting toward the second dampening member, and the end of the arm of the second dampening member comprises an outward stop projecting toward the first dampening member, said outward stop of the first dampening member and said outward stop of the second dampening member cooperating together to prevent the pivotal movement of the dampening members past a predetermined pivoting angle.

6. A damper according to claim 1, wherein the weight of the second dampening member is heavier than the weight of the first dampening member.

7. A damper according to claim 1, wherein the connecting means of the support member comprises a clamp for clamping the damper to the overhead cable.

8. A damper according to claim 1, wherein the support member comprises two parallel arms connecting the first end to the second end thereof, the support axis extending between said two parallel arms.

9. A damper according to claim 8, wherein the support member is mounted between the two parallel arms by means of a screw.

10. A damper according to claim 1, wherein the support member comprises a support arm connecting the first end to the second end thereof, the support axis projecting generally perpendicularly from said support arm.

11. A damper according to claim 10, wherein the support member further comprises a closing plate, the support member being mounted along the support arm by means of a screw extending between the support arm and said closing plate.

12. A damper according to claim 1, wherein the connecting means for rigidly connecting the axial member to the second end of the support member comprise recesses formed in the second end, and projections of the axial member that cooperate with said recesses.

* * * * *